United States Patent [19]

Price et al.

[11] 4,160,798

[45] Jul. 10, 1979

[54] RELEASE COATINGS

[76] Inventors: Lawrence Price, 63 Portland Ave., Old Orchard Beach, Me. 04064; Mose A. Russo, Anderson Rd., Sebago, Me. 04075

[21] Appl. No.: 796,714

[22] Filed: May 9, 1977

[51] Int. Cl.² ............................................. B29D 7/02
[52] U.S. Cl. .................... 264/213; 264/130; 264/338; 264/DIG. 60
[58] Field of Search ............... 264/131, 213, 130, 338, 264/166, DIG. 60

[56] References Cited

U.S. PATENT DOCUMENTS

| | | | |
|---|---|---|---|
| 2,883,315 | 4/1959 | Palmquist | 264/213 |
| 3,560,456 | 2/1971 | Hazen | 260/78.5 |
| 3,706,703 | 12/1972 | Heilman | 260/78.5 T |
| 3,826,677 | 7/1974 | Michels | 264/213 X |
| 3,898,114 | 8/1975 | Ward | 156/90 |
| 3,928,707 | 12/1975 | Lauterbach | 106/213 X |
| 3,946,135 | 3/1976 | Peterson | 428/411 |
| 4,029,843 | 6/1977 | Shah | 428/352 |
| 4,076,666 | 2/1978 | Power et al. | 260/22 CB |
| 4,117,198 | 9/1978 | Power et al. | 428/452 |
| 4,118,541 | 10/1978 | Power et al. | 428/452 |

OTHER PUBLICATIONS

Technical Data Bulletin, Gulf PA–18 published by Gulf Oil Chemicals Co., May, 1976 pp. 1 & 7.

Metetsky, T. S., Application 190 388 U.S. Priority Document corresponding to Japan patent 48/49825 filed Oct. 1977.

*Primary Examiner*—Jeffery R. Thurlow

[57] ABSTRACT

Release paper provided with a coating comprising a copolymer of an aliphatic 1-olefin and maleic anhydride, preferably hydrolyzed with a monovalent cationic hydroxide.

4 Claims, No Drawings

RELEASE COATINGS

BACKGROUND OF THE INVENTION

1. Field of the Invention

The present invention relates to release coatings for paper and related fibrous substrates. More specifically, it relates to coated paper which is generally classified in the art as release paper and which is characterized by its ability to separate intact from a surface which is normally adherent.

2. Description of the Prior Art

In a process for producing films or sheets of thermoplastic material, such as vinyl resins or polyurethane resins, the material in a flowable form, usually a plastisol, is deposited or "cast" on the supporting surface, heated to consolidate the thermoplastic material into a continuous self-supporting film, cooled and stripped from the support. A web of paper or equivalent flexible material having a layer of a "release coating" on its surface is typically used for supporting or carrying the film of thermoplastic material during the process of its consolidation. A release coating is one from which the cooled, consolidated film will readily part without being marred or distorted during separation.

When the web of flexible material is paper, the release coated paper web is generally referred to as "release paper". This release paper provides a surface against which the thermoplastic material forms and from which it will readily release and impart to the surface of the material the quality of finish of the release surface. When a textured surface is desired on the surface of the thermoplastic sheet material, the release paper is provided with an embossed surface, generally by mechanically embossing the paper prior to or following application of the release coating.

Release papers are also useful in applications other than for casting resinous films. For example, they are useful in the preparation of plastic laminates which are useful in various furniture articles such as cabinets, table tops and vanities, as well as paneling, wall coverings, partitions and doors. A conventional manner of forming these laminates is to place a lamination "sandwich" composed of a plastic layer and a desired substrate in a press and to mold them together by means of heat and pressure. The plastic layer may take the form of a resin impregnated or coated paper, known as a "prepreg." Alternatively, it may be in the form of a self-supporting plastic film. The substrate may be several fibrous layers, particle board or chip board.

When the laminate materials are placed in the press, a piece of release paper or other material having the release surface is placed in contact with the plastic layer on the side opposite the substrate. This not only prevents the plastic layer from adhering to the press, but, more importantly, imparts the surface characteristics of the release paper to the plastic surface to be molded. Thus, as a result of being molded in contact with a release coated surface, the plastic surface will have a smooth, textured, matte, glossy, or other desired finish. Obviously, because of the conditions in the press and the nature of the plastic, the release paper must have very good release characteristics. Examples of such plastic laminates and release coatings for such use are disclosed in U.S. Pat. No. 3,898,114 to Franklin J. Ward and U.S. Pat. No. 3,946,135 to John O. H. Peterson. These patents are herein incorporated by reference.

Another application where release papers are useful is for heat transferable printed designs, such as those used to heat transfer a design onto T-shirts, other articles of apparel and other suitable receptive surfaces. In this use, a design is printed upon a release paper for later transfer to these surfaces. The design may be printed with a polyvinyl chloride plastisol ink or it may be printed with an offset printing ink and overcoated with a layer of polyvinyl chloride plastisol. When placed against the receptive surface and heated the printed design and polyvinyl chloride plastisol overlayer, if one is used, transfers to the receptive surface where it sets upon cooling. In this application, the release surface must be capable of being printed upon and capable of releasing the printed material and overlying layer of polyvinyl chloride plastisol when it is transferred.

Usually, release papers comprise a base sheet provided with at least one first coating, conventionally referred to as a base coating, comprising a pigment or filler such as a paper coating grade clay together with an adhesive binder, and a second coating overlying the first and comprising an agent which provides the release function. The purpose of the base coating is to level and seal the surface. The pigment in the coating provides a smooth surface by masking the irregularities in the surface of the base sheet. The adhesive content of the coating is desired to prevent undue penetration of the subsequently applied release coating into the base sheet. In other words, the base coating provides a coating "hold up" function to keep the release agent at the surface while the coating dries. Any release agent which drains into the body of the base sheet would be ineffective to provide release. Therefore, to maximize the effectiveness of the amount of release agent applied, the base sheet is preferably base-coated to prevent penetration of the release coating into the body-stock. On the other hand, it is also desirable to reduce the number of coating operations performed. Therefore, it can be advantageous to provide the base coating and the release coating as a single coating.

Some release coatings are applied in a solvent system and others can be applied in an aqueous system. Solvent systems usually employ volatile materials which require special ventilation and safety precautions. Aqueous coatings have the advantage of a more convenient operation, but all release agents are not soluble in aqueous systems. Some release coatings are satisfactory for release from some materials, but not from others. For example, polyurethane films tend to release with difficulty from many release surfaces which are satisfactory for release of polyvinyl chloride.

SUMMARY OF THE INVENTION

It is an object of the invention to provide a release coating for a variety of uses and which can be coated in an aqueous system.

In accordance with the present invention a paper substrate is provided with a release coating by applying a coating formulation which comprises a copolymer of an aliphatic 1-olefin and maleic anhydride, preferably hydrolyzed with a monovalent cationic hydroxide (abbreviated hereinafter as "the copolymer"). The copolymer can also be dissolved in solvent systems, such as toluene or xylene. The aliphatic 1-olefin preferably has from 6 to 50 carbon atoms per molecule.

In the practice of the present invention one may follow the base coating of a substrate with the application of a light top coating of the release coating formulation of the present invention or one may eliminate the base coating entirely and apply to the substrate a single coating of the release coating formulation modified to include pigment and binder. Even when the release coating is coated on top of a base coating, the copolymer is preferably blended with an adhesive binder and may include pigment. The ranges of pigment, binder, and copolymer which are satisfactory for use in the invention are 3–60 parts of binder by weight per 100 parts of pigment and from 10–300 parts of copolymer by weight per 100 parts of pigment. The preferred proportions are approximately 10 parts binder and approximately 40 parts of copolymer per 100 parts of pigment. The binder can be chosen from any of the conventional paper coating binders, such as polyvinyl alcohol, styrene butadiene, polyvinyl acetates, acrylics, proteins, and starch. The binder is preferably one which can be used in an aqueous coating to permit its use with the copolymer in a water solution. The pigment can be chosen from any of the conventional paper coating pigments, such as clay, calcium carbonate and titanium dioxide.

The invention is also the method of using the release paper for forming film materials, such as polyvinyl chloride plastisol or polyurethane by casting the film material in a flowable form onto the release coating of the release paper, drying it, curing it if necessary, and stripping it from the release paper. The invention is also the method of using the release paper to heat and pressure consolidate sheets of plastic laminates which includes the step of pressing a sheet of thermosetting resin against the release paper when consolidating the sheets.

The invention is also the composite of sheets formed by casting a film of resinous material onto the release paper, and from which the film of resinous material can be satisfactorily stripped from the release paper. The invention also includes the composite of plastic laminates comprising one or more laminates of resin saturated core stock and an overlying sheet of resin in contact with the release paper and from which the release paper can be easily and satisfactorily removed after heat and pressure consolidation of the laminates. The invention is also a heat transferable printed design comprising the release paper of the invention having printed thereon a design either in polyvinyl chloride plastisol or in offset printing ink with an overlying layer of polyvinyl chloride plastisol.

DETAILED DESCRIPTION OF THE PREFERRED EMBODIMENTS

The release coating formulation of the present invention is applied to a suitable base paper or a substrate. The principal requirement for the substrate is that it have a relatively high degree of coating hold-up. This property of the substrate will determine the number and weight of subsequently applied coatings that are necessary to provide the desired release. Naturally, for the sake of economy, few coatings and lighter coating weights are preferred. The requisite coating hold-up properties may be provided by plain uncalendered paper, by calendered paper, or by previously coated paper, either calendered or uncalendered. It is not critical whether the paper is internally sized.

The release agent employed in the release coating of the invention is a copolymer of an aliphatic 1-olefin and maleic anhydride. The olefin preferably has from 6 to 50 carbon atoms per molecule. Examples of the copolymer and description of its preparation are described in U.S. Pat. Nos. 3,560,456 and 3,706,703, which are herein incorporated by reference. A number of variations of the copolymer are available from Gulf Oil Corporation. In using the copolymer in the invention, it is preferably hydrolyzed by dissolving it in a water solution with a monovalent cationic hydroxide, preferably potassium hydroxide, while heating and agitating the mixture.

The principal features and advantages of the invention will be further understood upon the consideration of following specific examples.

EXAMPLE 1

A coating was prepared from a sample of Gulf Oil Corporation's PA-18, a linear, low molecular weight copolymer of octadecene-1 and maleic anhydride, with the comonomers being present in a 1:1 molar ratio. The physical properties of the copolymer are as follows: melting range—115°–119° C.; acid no. 337; anhydride content 24.4% by weight; acid content—2.8% by weight; density 0.973; inherent viscosity (based on 5.0 g/dl in methyl isobutyl ketone at 77° F.)—0.144. Twenty-five grams of PA-18 was dissolved in a solution of 6 grams of potassium hydroxide in 200 milliliters of water. A small amount of surfactant was employed (Triton X-100, Rohm & Haas wetting agent, a non-ionic alkylaryl polyether alcohol). The mixture was agitated and heated at about 95° C. Upon cooling the solution, it was coated on a base web prepared from body stock weighing about 92 pounds per ream (3300 sq. ft.) made from conventional wood fibers, conventionally starch surface sized and further provided with two base coatings to provide a base web with good holdout strength. The first base coating was a conventional pigmented coating with a starch-latex binder, and the second base coating was a conventional pigmented coating with a latex-protein binder. The release coating was applied with a No. 10 Meyer Rod and resulted in coating weight of 2 pounds per ream. The coating was dried at 190° C. for one minute.

To test the release properties of the coated paper of Example 1, a film forming material of polyvinyl chloride plastisol was applied to the coated web, dried and cured to harden the plastisol. The material was then stripped from the release surface. It stripped satisfactorily as a self-supporting film. As further test, a film forming material of polyurethane resin in a isopropyl alcohol-toluene system was applied to another portion of the coated web, dried and cured. The film was then stripped from the release surface and found to strip satisfactorily as a self-supporting film. The surfactant was found to be beneficial in avoiding shedding of the release coating and improving release.

EXAMPLE 2

The coating formulation of Example 1 was blended with polyvinyl alcohol (E. I. DuPont's Elvanol 90-50) in a ratio of 5:1 PA-18/PVA, and coated and dried in the same manner as in Example 1. The same release tests were applied as in Example 1 with satisfactory results.

EXAMPLE 3

Fifty parts of PA-18 was dissolved in 12 parts potassium hydroxide and 400 parts water at 160° F. under agitation. The solution was coated on 80 lbs. per ream base paper which had been starch sized and coated with one base coat of clay, starch, latex and polyvinyl alcohol. The solution was coated with an air knife coater using 2 psig. air pressure to obtain 1½ lbs. per ream coating weight. The coating was dried and tested for release properties in the same manner as in Example 1, and found to be satisfactory.

Release papers similar to those of the above examples were tested in the consolidation of decorative plastic laminates. After heat and pressure consolidation of the laminates, the release paper was found to produce satisfactory release from the resinous surface layers. The resin sheets tested were polyester and melamine for high pressure and low pressure use. Additional release papers similar to those of the above examples were tested in heat transferable decorative print sheets as described earlier and found to release satisfactorily.

Variations of chain length in the olefin comonomer were tested and found capable of releasing a vinyl plastisol film and a polyurethane film. The copolymers tested had olefin chain lengths of 6, 10, 14, 18 and a mixture of 30 to 50. All tested were found to be satisfactory for vinyl release. Copolymers having olefin chain length from 18 and above were found preferable for urethane release.

Other variations and modifications may occur to one of ordinary skill in the art without departing from the present invention.

What is claimed is:

1. In a method of forming a film of resinous material which includes the step of casting the film of resinous material in a flowable state onto a piece of paper having an easy release surface, drying the resinous film material and stripping it from the release surface, the improvement which comprises casting the film of resinous material onto a piece of paper having a release coating comprising a copolymer of an aliphatic 1-olefin having from 6 to 50 carbon atoms per molecule and maleic anhydride hydrolyzed with potassium hydroxide.

2. The method of claim 1, wherein the aliphatic 1-olefin is 1-octadecene.

3. The method of claim 1, wherein the resinous film material is polyvinyl chloride plastisol.

4. The method of claim 2, wherein the resinous film material is polyurethane.

* * * * *